United States Patent
Abo et al.

[11] Patent Number: 5,948,041
[45] Date of Patent: Sep. 7, 1999

[54] INFORMATION SERVICE DEVICE HAVING SIMPLE DATA RETRIEVAL CAPABILITIES

[75] Inventors: Masatoshi Abo, Toyota; Michima Ogawa, Nagoya; Kunihiro Ishikawa, Okazaki, all of Japan

[73] Assignee: Denso Corporation, Kariya, Japan

[21] Appl. No.: 08/790,791

[22] Filed: Jan. 30, 1997

[30] Foreign Application Priority Data

Jan. 31, 1996 [JP] Japan .................................. 8-015827

[51] Int. Cl.⁶ .................................................. G06F 165/00
[52] U.S. Cl. .......................... 701/207; 701/214; 701/300; 455/456
[58] Field of Search .................................. 701/207, 200, 701/213, 214, 300; 73/178 R; 455/456, 457, 99, 73

[56] References Cited

U.S. PATENT DOCUMENTS

| | | | |
|---|---|---|---|
| 5,548,822 | 8/1996 | Yogo | 455/68 |
| 5,760,742 | 6/1998 | Branch et al. | 701/207 |

FOREIGN PATENT DOCUMENTS

| | | |
|---|---|---|
| 63-231477 | 9/1988 | Japan . |
| 1-103000 | 7/1989 | Japan . |
| 4-70999 | 3/1992 | Japan . |
| 7-72234 | 3/1995 | Japan . |

*Primary Examiner*—William A. Cuchlinski, Jr.
*Assistant Examiner*—Gertrude Arthur
*Attorney, Agent, or Firm*—Pillsbury Madison & Sutro LLP

[57] ABSTRACT

When a user selects an item from a menu displayed by a display unit of a vehicular terminal, a control unit of the vehicular terminal receives information data and location data corresponding to the information data from an information center and stores the data inside a database. After receiving present position data from a present position detection unit, the control unit determines location data that is nearest to the present position from among location data stored in the database. Then, the control unit drives the display unit to display the information data corresponding to the extracted location data, thus simplifying the selection process the user needs to perform to obtain the desired information.

25 Claims, 6 Drawing Sheets

B (Xb, Yb)

A (Xa, Ya)

| ITEM | LOCATION DATA | | INFORMATION |
|---|---|---|---|
| | A | B | |
| HOKKAIDO | (Xa1, Ya1) | (Xb1, Yb1) | MORNING: CLOUDY |
| | | | AFTERNOON: CLEAR |
| TOHOKU | (Xa2, Ya2) | (Xb2, Yb2) | CLEAR |
| KANTO | (Xa3, Ya3) | (Xb3, Yb3) | CLEAR |

INFORMATION SERVICE DEVICE HAVING SIMPLE DATA RETRIEVAL CAPABILITIES

CROSS-REFERENCE TO RELATED APPLICATION

This application is related to and claims priority from Japanese Patent Application No. Hei-8-15827, the contents of which are hereby incorporated by reference.

BACKGROUND OF THE INVENTION

1. Field of the Invention

The present invention relates to an information service device for communicating information data with a host device. The invention also relates to the host device for communicating information data with the information service device and, further, to an information communication system for controlling communication between the host device and the information service device.

2. Description of Related Art

One well-known conventional type of information service device that is installed in a vehicle receives information data from a host device and informs a user of the information by means of its display unit or the like.

When a user selects an item, for example, "weather information", from among the items displayed in a menu screen of the display unit of such conventional vehicular information service device, the display unit then displays a menu of items of a subsequent hierarchical level, e.g., names of prefectures or states arranged in a geographical order starting from the northernmost state or in an alphabetical order.

To obtain desired information, the user needs to find and select from the displayed information items the most vital information items, that is, optimal information items related to his or her present location.

In this way, one problem with the conventional information service device is that it requires the user to perform troublesome selection processes in order to obtain his or her desired information.

SUMMARY OF THE INVENTION

In view of the foregoing problems in the prior art, it is a goal of the present invention to provide an information service device which simplifies operations for obtaining desired information by a user.

To achieve the above object, one aspect of the present invention provides an information service device which has a command reception unit, a communication unit, a storage unit, a present position detection unit, a determination unit and a notification unit. The command reception unit is for receiving an external command indicative of an information item selected by a user. The communication unit is for receiving information data related to the information item and corresponding location data from an external host device. The storage unit is for storing information data and corresponding location data. The present position detection unit is for detecting a present position. The determination unit is for determining optimal location data from among location data stored in the storage unit based on the present position detected by the present position detection unit. The notification unit is for disseminating information data corresponding to the optimal location data determined by the determination unit. In this way, a user can retrieve desired information based on the present position of the information service device without having to perform complicated operations.

Preferably, the information service device is installed in a moving body like a vehicle with its present position detection unit detecting a present position of the moving body. Thus, a driver of a vehicle can obtain needed information without turning attention away from driving.

Another aspect of the present invention provides a host device for sending information data and location data to the information service device. The storage unit is for storing information data and corresponding location data. The reception unit is for receiving an information item command from the information service device. The retrieval unit is for retrieving selected information data and corresponding location data based on the information item command. The transmission unit is for sending the selected information data and corresponding location data to the information service device.

One other aspect of the present invention provides an information communication system that includes the information service device and the host device mentioned above.

BRIEF DESCRIPTION OF THE DRAWINGS

Additional objects and advantages of the present invention will be more readily apparent from the following detailed description of preferred embodiments thereof when taken together with the accompanying drawings in which:

FIG. 8A schematically illustrates a procedure for obtaining optimal location data when the present vehicle position is within two predetermined areas while

DETAILED DESCRIPTION OF PRESENTLY PREFERRED EXEMPLARY EMBODIMENTS

Preferred embodiments of the present invention are described hereinafter with reference to the accompanying drawings.

Figure 1:
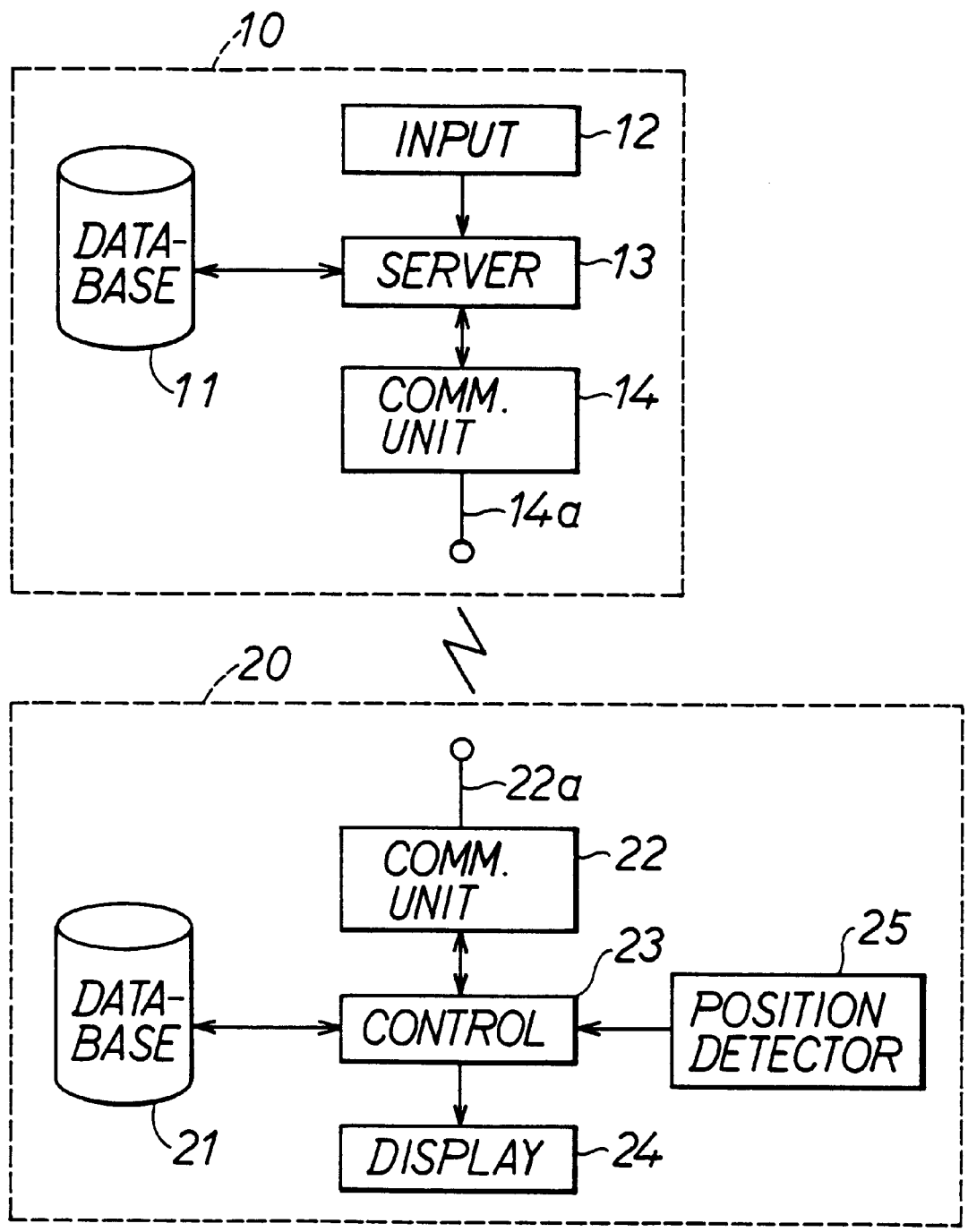
FIG. 1 is a schematic view of an information communication system according to an embodiment of the present invention.

As shown in FIG. 1, an information communication system includes an information center 10, which acts as a host outside a vehicle, and a vehicular terminal 20 installed as an information service device inside the vehicle.

The information center 10 includes a database 11, a data input unit 12, an information server 13 and a communication unit 14. The data input unit 12 receives information data and location data (described below) from sources inside or outside of the information center 10. The information server 13 is a computer that has an information service function. The communication unit 14 communicates with the vehicular terminal 20 via an antenna 14a. The communication unit 14 retrieves information data and location data from the database 11 and transmits the data to the vehicular terminal 20.

Figure 2:
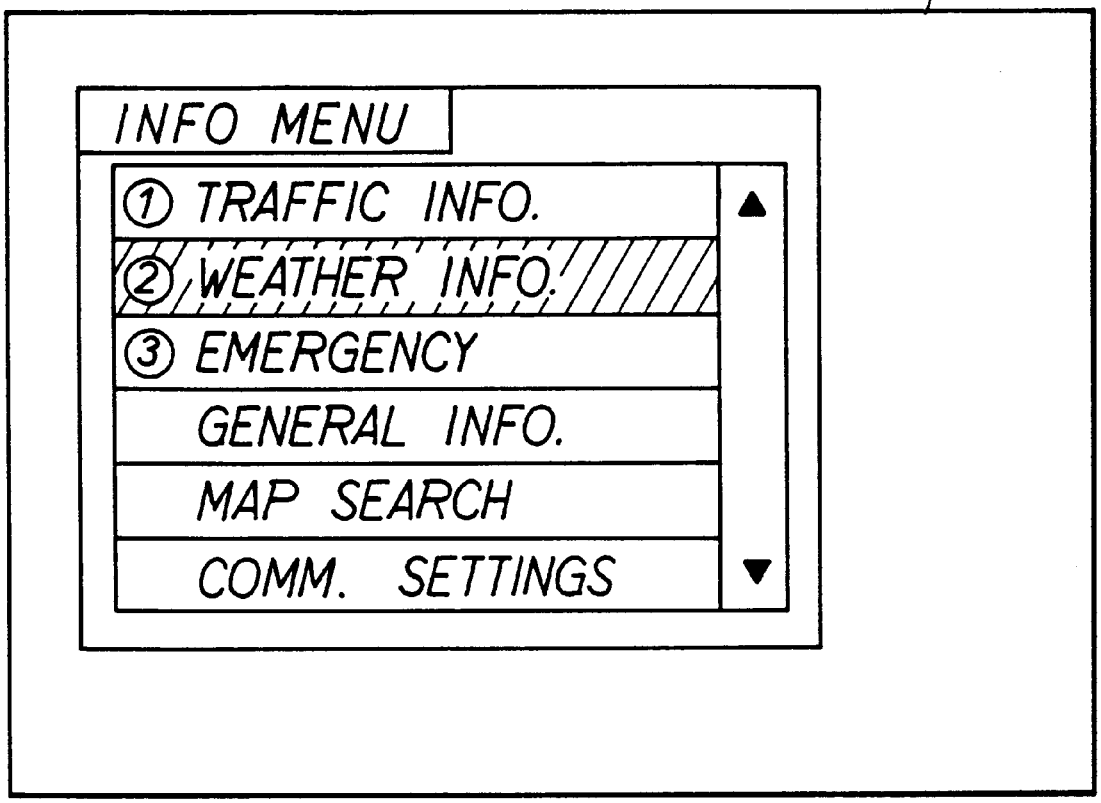
FIG. 2 is a front view of a display screen displaying a system menu of the information communication system shown in FIG. 1.
Figure 3:
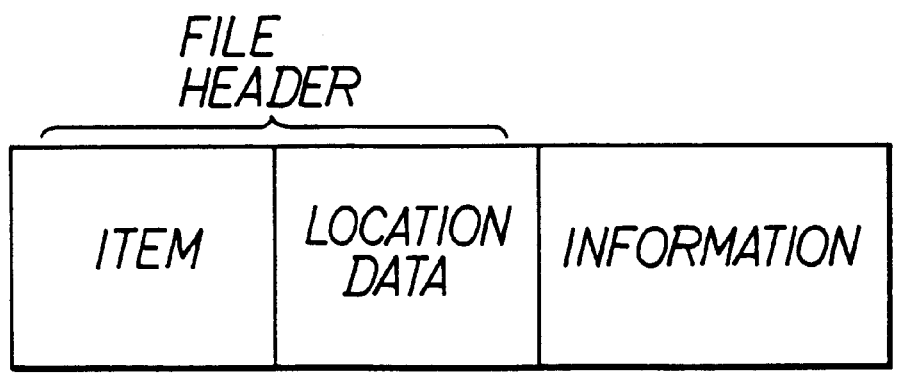
FIG. 3 illustrates a file format of information data and location data according to the embodiment.
Figures 4, 5:
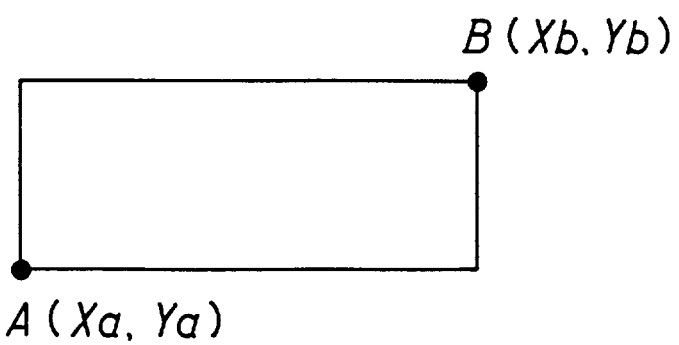
FIG. 4 illustrates an area defined by location data according to the embodiment.
FIG. 5 illustrates a data structure of the weather information item shown in the display screen of FIG. 2.

As shown in FIG. 2, the database 11 is set with various items such as traffic information, weather information, emergency information and the like. Each of these items includes a plurality of items of a lower hierarchical level. Each of the lower level items includes location data and information data of a particular area that corresponds to the location data. The database 11 stores location data together with the corresponding information data. More specifically, as shown in FIG. 3, the database 11 stores the items as files with the name of an item and location data acting as a file header that precedes the information data. As shown in FIG. 4, the location data is expressed as latitudes and longitudes (Xa, Ya), (Ya, Yb) of two points A, B to define an area having predetermined dimensions.

In the present embodiment, for example, the weather information item shown in FIG. 2 has lower hierarchical level items that are provided separately to indicate prefectures or states arranged geographically from the northernmost state as shown in FIG. 5. Each lower level item is assigned with information data (weather data in this case) and its corresponding location data in the database 11.

Meanwhile, as shown in FIG. 1, the vehicular terminal 20 includes a database 21, a communication unit 22, a control unit 23, a display unit 24 and a present position detection unit 25. Upon receiving information data and location data from the information center 10, the database 21 stores the information data together with the corresponding location data shown in FIG. 5. The communication unit 22 communicates with the information center 10 via an antenna 22a.

The control unit 23 has a computer that includes a CPU, ROM, RAM and the like. The display unit 24 has a display screen 24a (shown in FIG. 2) that is disposed in an instrument panel in the passenger compartment of a vehicle. The present position detection unit 25 is for calculating coordinates of a present position of the vehicle based on signals from a GPS (Global Positioning System) sensor, a gyro, a vehicle speed sensor and the like.

Next, the control operation performed by the control unit 23 of the vehicular terminal 20 will be described with reference to the flowchart of FIG. 6.

Figure 6:
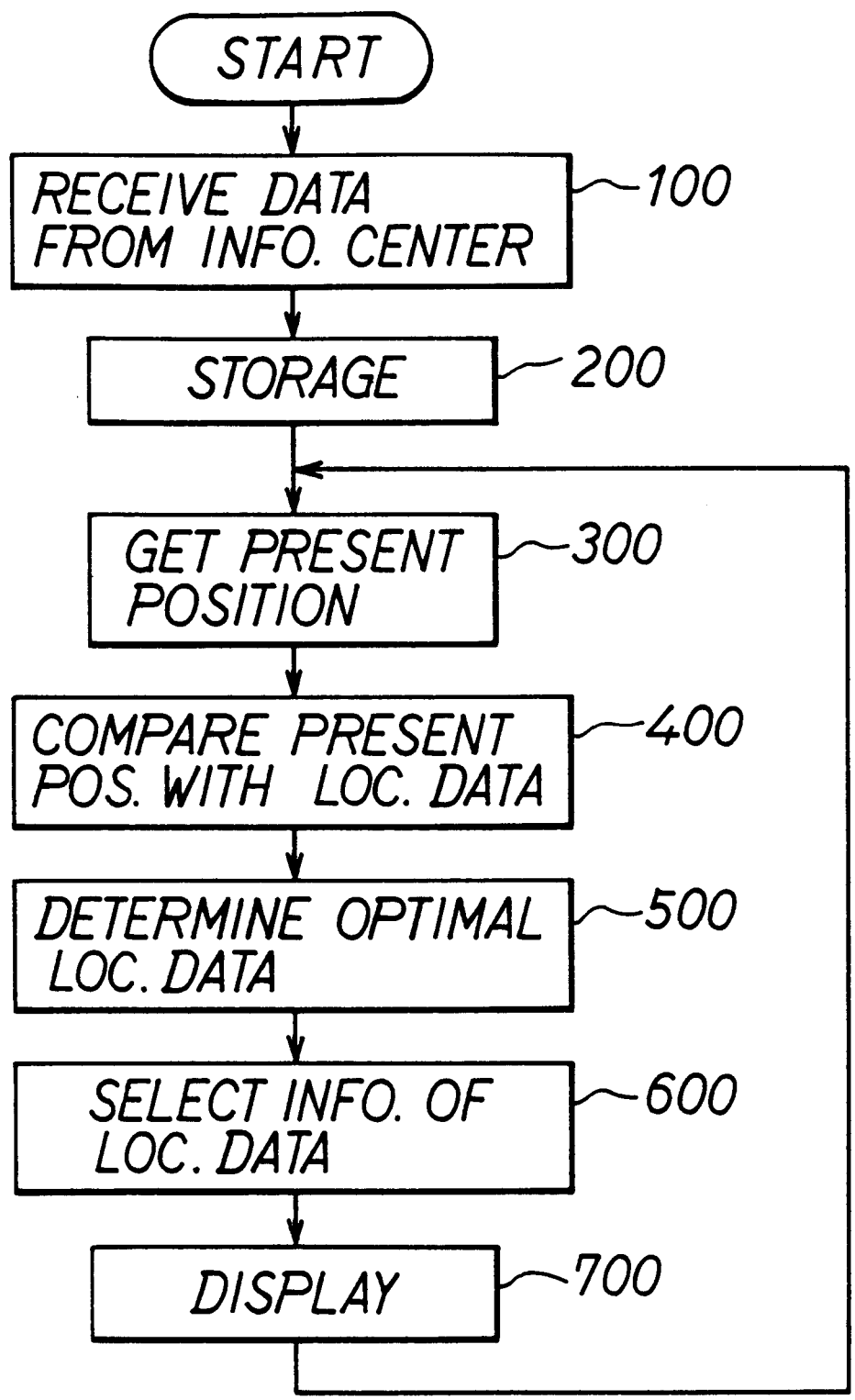
FIG. 6 is a flowchart of a control process performed by a control unit of an information service device according to the embodiment.

The control unit 23 executes the control process shown in FIG. 6 when a person in the passenger compartment selects an item from the menu displayed on the screen 24a of the display unit 24 shown in FIG. 2. In this control process, step 100 receives a plurality of information data and corresponding location data (see FIGS. 3, 5), which are related to the selected item, from the information center 10. Subsequent step 200 stores the received data in the database 21 so that the information data and the location data correspond with each other.

Subsequent step 300 reads the coordinates of the present location as calculated by the present position detection unit 25. Step 400 then compares the coordinates of the present position with the plurality of location data received from the information center 10. More specifically, step 400 computes the distances between the coordinates of the present position and the coordinates of the centers of the individual areas defined by the location data (see FIG. 4) for each of the items received in step 100.

Subsequent step 500 determines the optimal location data. According to this embodiment, the control unit 23 determines the location data whose center has the minimum distance from the present position as computed in step 400.

Step 600 retrieves from the database 21 the information data that corresponds to the optimal location data determined in step 500. Step 700 then drives the display unit 24 to display the retrieved information data.

Figure 7:
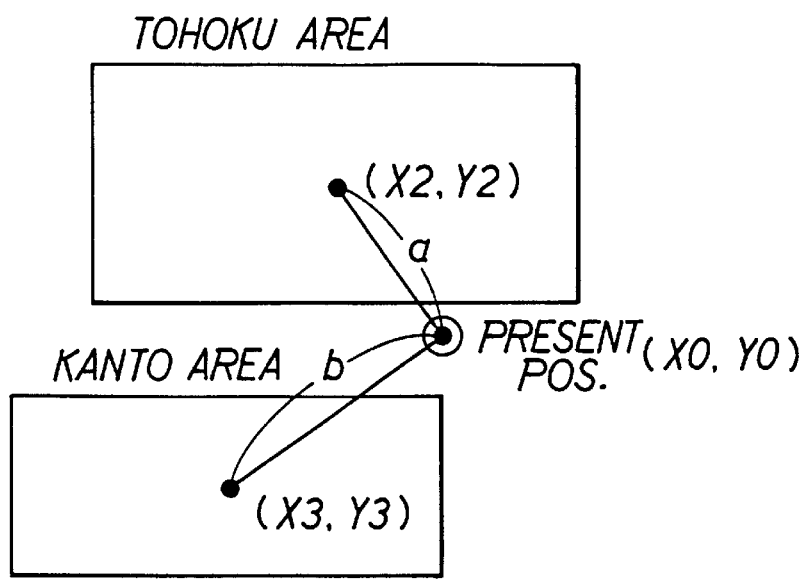
FIG. 7 schematically illustrates a procedure for obtaining optimal location data when the present vehicle position is not within any predetermined area.

Thus, for example, as shown in FIG. 7, when a user selects the weather information while the vehicle is traveling in the Tohoku area with the present position, the center of the Tohoku area and the center of the Kanto area set as (X0, Y0), (X2, Y2) and (X3, Y3), respectively, then the control unit 23 determines the center (X2, Y2) of the Tohoku area as the optimal location data because the distance a from the present position to the center of the Tohoku area is shorter than the distance b from the present position to the center of the Kanto area. Subsequently, the display unit 24 displays the weather information of the Tohoku area.

Figure 8A:
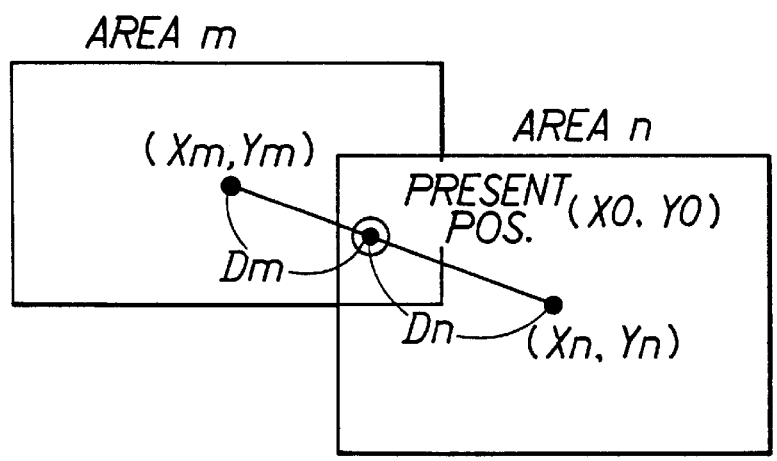

Likewise, FIG. 8A shows another example where the present position, the center of a predetermined area m and the center of another predetermined area n are set as (X0, Y0), (Xm, Ym) and (Xn, Yn), respectively, with the present position being within both area m and area n. Here, the control unit 23 compares the distance Dm from the present position to the center of the area m and the distance Dn from the present position to the center of the area n, and determines as the optimal location data the area whose center is nearest to the present position. The information data corresponding to the determined location data is displayed by the display unit 24.

Figure 8B:
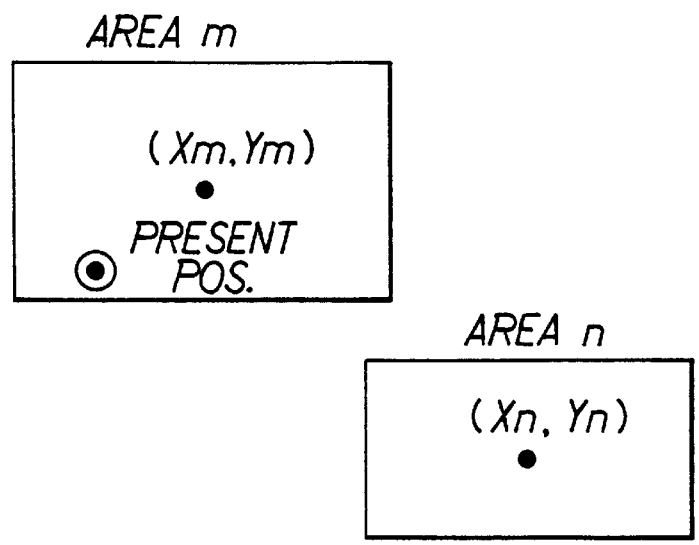
FIG. 8B illustrates a procedure for obtaining optimal location data when the present vehicle position is within only one predetermined area.

As shown in FIG. 8B, in case the present position (X0, Y0) is within the area m but is not within the area n or any other area, the control unit 23 determines the center (Xm, Ym) of the area m as the optimal location data. Then, the display unit displays the information data regarding the area m.

Accordingly, it will be easy for a user to obtain desired information because information data of the area closest to the present position of the vehicle is automatically displayed in the display unit 24 in response to the user's simple operation of selecting a desired item from the menu shown in FIG. 2.

Although the present invention has been fully described in connection with a preferred embodiment thereof with reference to the accompanying drawings, it is to be noted that various changes and modifications will become apparent to those skilled in the art.

For example, although the foregoing embodiment determines and displays the data of the location that is the nearest to the present vehicle position regardless of whether the location is in the forward traveling direction of the vehicle, the control unit 23 may determine data of a location which is nearest to the present vehicle position from among locations that are in the forward direction of the vehicle's traveling direction and the display unit 24 may then display the information data corresponding to the determined location data.

Figure 9A:
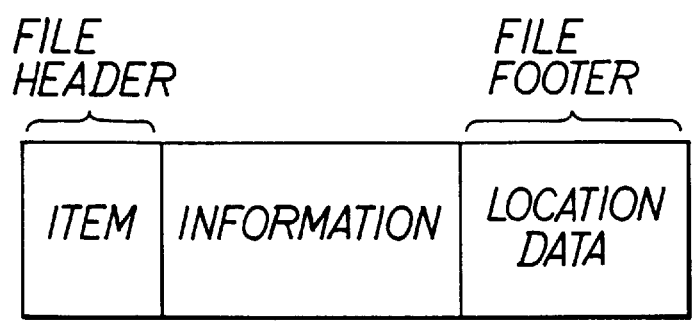
FIGS. 9A and 9B illustrate variations of file formats of information data and location data.

Although the foregoing embodiment adopts the file format of information data and location data shown in FIG. 3, in which location data are stored together with the name of the item as file headers followed by corresponding information data, FIG. 9A shows another possible file format in which the name of the item acts a file header, the information data is stored following the file header and the location data is stored as a file footer following the information data.

Figure 9B:
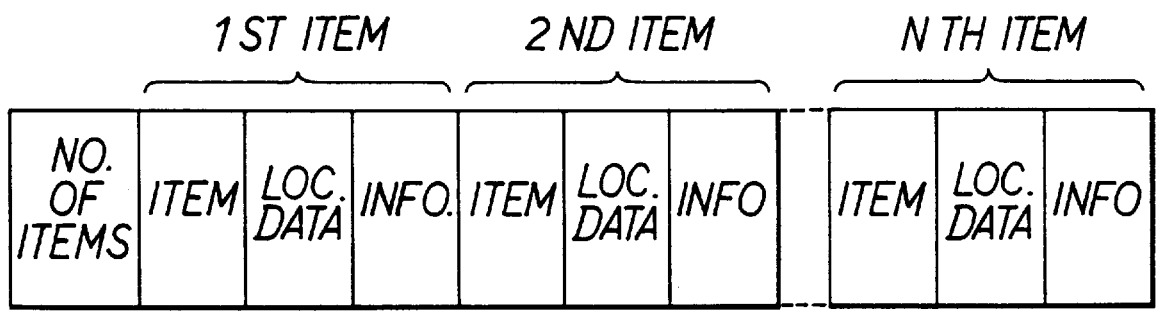

Moreover, FIG. 9B shows another possible data format which can be adopted when information data is provided as a list. Information data and location data may also be stored in separate files. These and other file formats may be used for storing the data received from the information center 10 as long as the information data and the location data are made to correspond to each other inside the database 21.

Although location data define areas in the foregoing embodiment, location data may also indicate points.

Although the foregoing embodiment expresses location data in terms of latitudinal and longitudinal coordinates, a specially designed coordinate system may also be used for expressing the location data. Furthermore, the location data may also be expressed as names of areas (for example, names of states, prefectures, cities, towns etc.), area codes, etc.

Although information data is displayed by the display unit 24, sound or voice may also be used for notifying the driver or the passenger of the information data. Although the vehicular terminal 20 retrieves information data and location data from the information center 10 at each timing when it becomes necessary to display information data in the display unit 24 in the foregoing embodiment in response to the user's selection of a desired item from the menu items shown in FIG. 2, it is also possible to immediately process the information data and location data from the database 21 in steps 300–700 if these data are stored beforehand in the database 21.

Although the information service device 20 is installed in a mobile body such as a motor vehicle in the foregoing embodiment, the invention is not limited to this arrangement. For example, it is possible to design a portable information service device that a user can carry into a mobile body (for example, a train). The portable information service device of this arrangement detects its present position using the present position detector, compares the present position with location data from a host device, determines optimal data, and notifies the user of the data, thus achieving substantially the same advantages as that of the foregoing embodiment.

Such changes and modifications are to be understood as being within the scope of the present invention as defined by the appended claims.

What is claimed is:

1. An information service device comprising:
   command reception means for receiving an external command indicative of an information item selected by a user;
   communication means for receiving information data related to said information item and corresponding location data from an external host device;
   storage means for storing said information data and said corresponding location data received by said communication means;
   present position detection means for detecting a present position;
   determination means for determining optimal location data from among said location data stored in said storage means based on said present position detected by said present position detection means; and
   notification means for disseminating information data corresponding to said optimal location data determined by said determination means;
   said communication means being further for receiving from said external host device a plurality of information data regarding said selected information item, and a plurality of location data each corresponding to respective ones of said plurality of information data, said determination means for determining said optimal location data among said plurality of location data.

2. An information service device according to claim 1, said device further comprising: data format setting means for setting a data format of said information data and said corresponding location data; wherein
   said communication means is for receiving said information data and
   said corresponding location data based on said data format.

3. An information service device according to claim 1, wherein:
   said communication means and said notification means are installed in a moving body; and
   said present position detection means is for detecting a present position of said moving body.

4. An information service device according to claim 1, wherein:
   each of said location data defines a respective geographical area; and
   said determination means is for determining said optimal location data based on a relationship between a point within each of said respective geographical areas and said present position detected by said present position detection means.

5. The information service device according to claim 1, wherein each of said plurality of location data covers a different geographic area.

6. The information service device according to claim 1, wherein said determination means is for comparing said plurality of location data with a present geographic location to determine said optimal location data.

7. The information service device according to claim 1, wherein said determination means compares said plurality of location data with a present geographic location with representative coordinates in an area of said plurality of location data to determine said optimal location data.

8. The information service device according to claim 1, wherein said determination means determines said optimal location data by identifying an area which includes a present geographic location among areas covered by said plurality of location data.

9. The information service device according to claim 1, wherein said notification means automatically disseminates said information data after said determination means determines said optimal location data.

10. The information service device according to claim 1, wherein said information service device and said host device communicate via a telephone link.

11. The information service device according to claim 1, wherein said determination means determines said optimal location data from said plurality of location data covering an area being approached.

12. The information service device according to claim 1, wherein said information item is selected from the group consisting of traffic information, weather information and emergency help information.

13. An information communication system, comprising:
   a) command reception means for receiving an external command indicative of an information item selected by a user;
   b) a host device for generating information data and corresponding location data in accordance with said information item selected by said user, said information data and corresponding location data including a plurality of information data corresponding to said selected information item, and a plurality of location data each corresponding to respective ones of said plurality of information data;

c) an information service device having
   i) communication means for receiving said information data and said corresponding location data from said host device, and
   ii) storage means for storing said information data and said corresponding location data;

d) present position detection means for detecting a present position of said information service device; and e) determination means for determining optimal location data from among said location data stored in said storage means based on said present position detected by said present position detection means; and f) notification means, attached to said information service device, for disseminating information data corresponding to said optimal location data determined by said determination means.

14. An information communication system according to claim 13, wherein:

each of said location data defines a respective geographical area; and said determination means is for determining said optimal location data based on a relationship between a point within said respective geographical areas and said present position detected by said present position detection means.

15. The information service device according to claim 13, wherein:

said communication means and said notification means are installed in a moving body; and said present position detection means is for detecting a present position of said moving body.

16. The information communication system according to claim 13, wherein each of said plurality of location data covers a different geographic area.

17. The information communication system according to claim 13, wherein said determination means is for comparing said plurality of location data with a present geographic location to determine said optimal location data.

18. The information communication system according to claim 13, wherein said determination means compares said plurality of location data with a present geographic location with representative coordinates in an area of said plurality of location data to determine said optimal location data.

19. The information communication system according to claim 13, wherein said determination means determines said optimal location data by identifying an area which includes a present geographic location among areas covered by said plurality of location data.

20. The information communication system according to claim 13, wherein said notification means automatically disseminates said information data after said determination means determines said optimal location data.

21. The information communication system according to claim 13, wherein said information service device and said host device communicate via a telephone link.

22. The information communication system according to claim 13, wherein said determination means determines said optimal location data from said plurality of location data covering an area being approached.

23. The information communication system according to claim 13, wherein said information item is selected from the group consisting of traffic information, weather information and emergency help information.

24. A host device for sending information data and location data to an information service device, said host device comprising:

storage means for storing information data and corresponding location data;

reception means for receiving an information item command from said information service device;

retrieval means for retrieving selected information data and corresponding location data from said storage means based on said information item command from said information service device, said selected information data and corresponding location data including a plurality of information data associated with said selected information item, and a plurality of location data each corresponding to respective ones of said plurality of information data;

format setting means for setting a data format of said selected information data and corresponding location data; and transmission means for sending said selected information data and corresponding location data to said information service device based on said data format.

25. A method for disseminating information data to a user inside a mobile body, said method comprising the steps of:

receiving an external command indicative of an information item selected by a user;

retrieving information data and corresponding location data based on said information item from an external host device, said information data and corresponding location data including a plurality of information data corresponding to said selected information item, and a plurality of location data each corresponding to respective ones of said plurality of information data;

storing said information data and corresponding location data received from said external host device;

detecting a present position of said mobile body;

determining optimal location data from among said location data based on said present position; and disseminating information data corresponding to said optimal location data.

* * * * *